Patented Mar. 13, 1923.

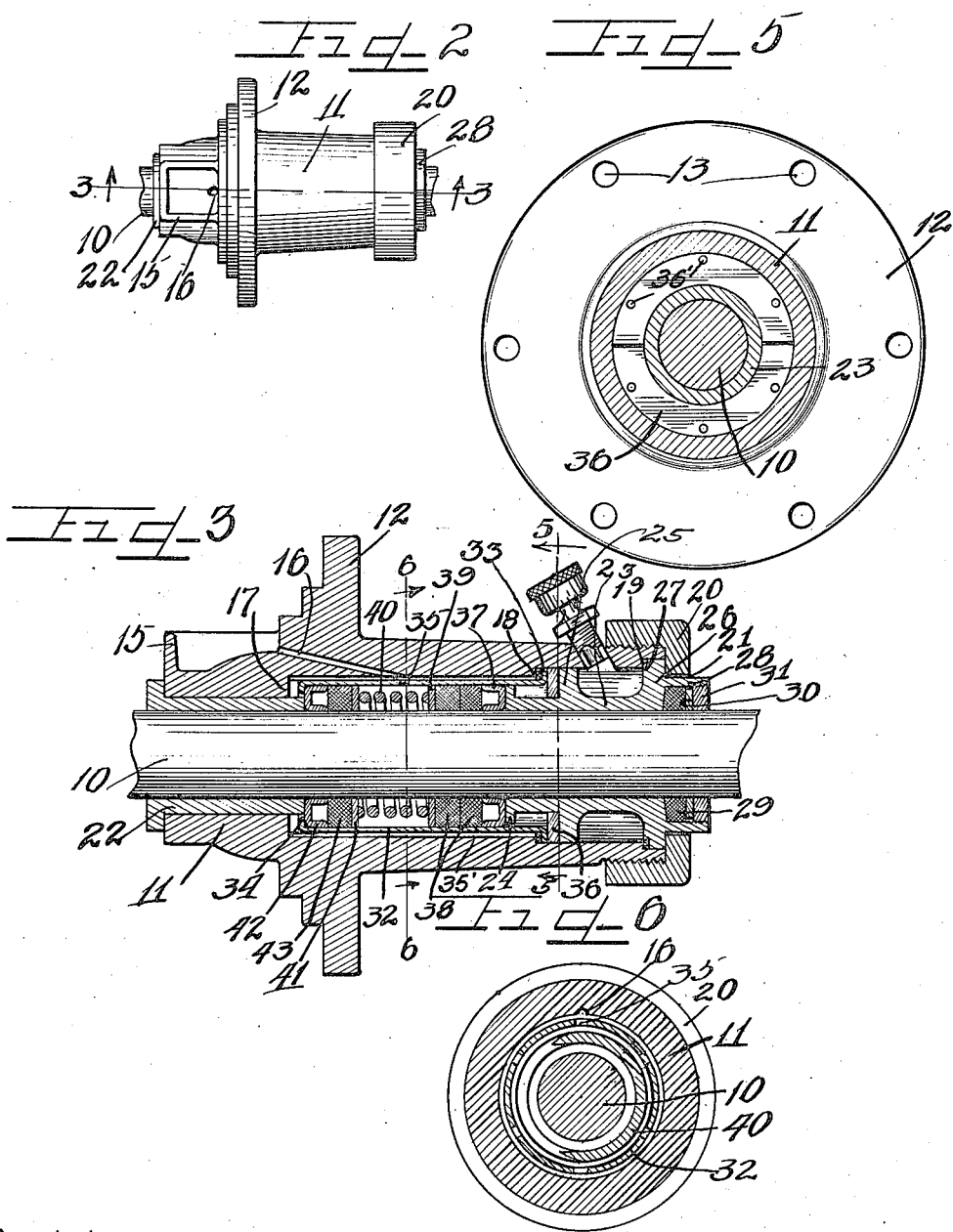

1,448,021

UNITED STATES PATENT OFFICE.

WILLIAM WISHART AND ALBERT H. MORRELL, OF CLINTON, IOWA, ASSIGNORS TO CLINTON REFRIGERATING COMPANY, OF CLINTON, IOWA, A CORPORATION OF IOWA.

SELF-ADJUSTING OIL-SEAL PRESSURE PACKING.

Application filed September 8, 1919. Serial No. 322,384.

*To all whom it may concern:*

Be it known that we, WILLIAM WISHART and ALBERT H. MORRELL, both citizens of the United States, and both residents of the city of Clinton, in the county of Clinton and State of Iowa, have invented certain new and useful Improvements in a Self-Adjusting Oil-Seal Pressure Packing; and we do hereby declare that the following is a full, clear, and exact description of the same, reference being had to the accompanying drawings, and to the numerals of reference marked thereon, which form a part of this specification.

This invention relates more particularly to an improved type of a packing device adapted to be removably mounted within a bearing mechanism which closes one end of a compressor crank case, said packing device being self-adjusting and affording an oil seal pressure packing for the end of the compressor crank shaft which projects through the bearing and through the bearing mechanism and through the packing device and has the driving pulley mounted on the projecting end thereof.

It is an object of this invention to provide an automatically adjustable oil seal pressure packing for the driving end of a machine crank shaft.

It is also an object of the invention to provide a spring controlled self-adjusting packing adapted for use on the driving end of a machine crank shaft.

Another object of the invention is to provide a self-adjusting packing unit adapted to be removably mounted on the driving end of a crank shaft within a bearing housing.

A further object of this invention is the construction of a packing unit adapted to be removably engaged within a crank shaft bearing housing in a compressed condition to permit automatic adjustment of the packing members within the packing unit.

It is furthermore an object of the invention to construct a packing unit for removable engagement on a shaft within a bearing housing, said packing unit having members adapted to be telescoped with respect to each other when mounted in place to compress a controlling spring which acts to automatically adjust the packing rings disposed within one of said members.

It is an important object of this invention to provide a packing unit wherein slidably interfitting members have packing rings disposed therebetween adapted to be automatically adjusted.

Other and further important objects of this invention will be apparent from the disclosures in the drawings and the specification.

The invention (in a preferred form) is illustrated in the drawings and hereinafter more fully described.

On the drawings:

Figure 2 is an elevational view of the packing unit housing.

Figure 3 is an enlarged sectional view taken on line 3—3 of Figure 2, and showing the packing unit removably secured in position.

Figure 5 is a section taken on line 5—5, of Figure 3.

Figure 6 is a detail section taken on line 6—6, of Figure 3.

As shown on the drawings:

Figure 1:
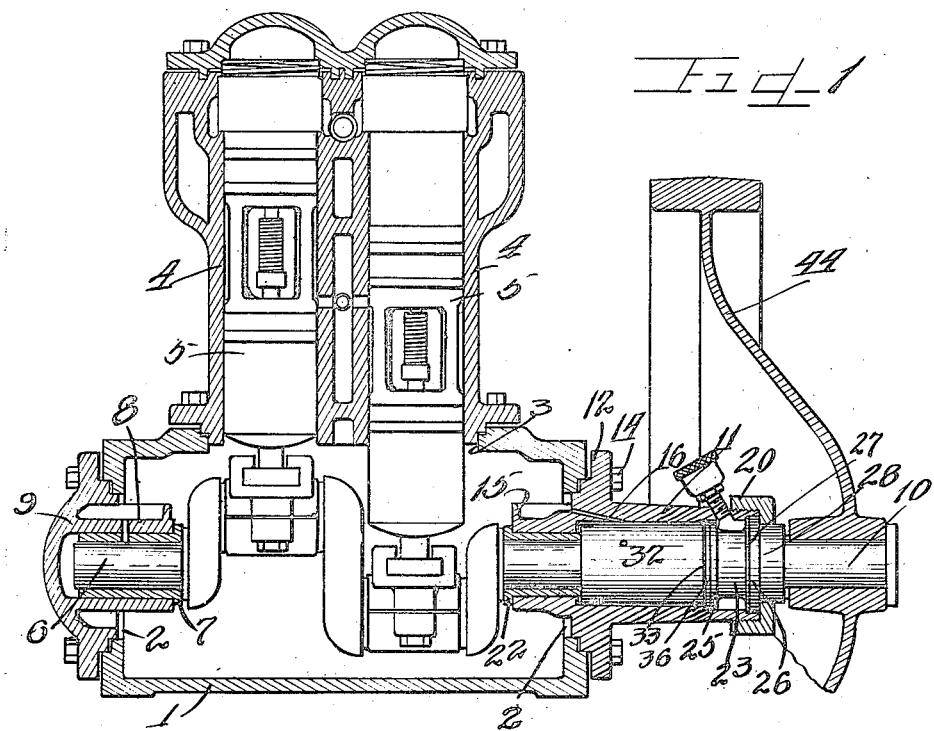
Figure 1 is a longitudinal central vertical section of a compressor with parts broken away and parts shown in elevation, and equipped with a packing unit embodying the principles of this invention.

The reference numeral 1, indicates a crank case provided with an opening 2, in each of the end walls thereof, and with an opening 3, in the top wall to receive the lower end of a pair of connected parallel cylinders 4. Slidably mounted within the cylinders 4, are pistons 5, connected with the crank pins of a crank shaft mounted in the crank case 1. The crank shaft has the short end 6, thereof disposed in a bearing sleeve 7, which is secured in a supporting sleeve 8, integrally formed on a journal box or cap 9, secured to one of the crank case end walls to close the opening therein and afford a suitable crank shaft support. The other or long driving end 10, of the crank shaft, projects outwardly through the opening in the other end wall of the crank case.

The end 10, of the crank shaft projects through a journal box or packing housing 11, on which a circular flange plate 12, is integrally formed at right angles intermediate the ends thereof, to permit the housing to be removably secured to the second end plate of the crank case to close the opening in said end plate. The flange plate 12, is provided with a plurality of openings 13, to permit attaching bolts 14, to be projected therethrough and screwed into the crank case end wall. Integrally formed on the upper side or top of the inner end of the housing 11, is an open oil cup or oil box 15, adapted to receive oil splashed thereinto by the crank shaft. An inclined feed passage 16, is provided in the housing 11, and leads downwardly from the oil cup 15, and opens in the bore of the housing. The diameter of the bore of the housing 11, increases in steps from the inner to the outer end to afford a number of shoulders 17, 18 and 19 respectively. The outer end of the housing 11, is externally threaded, for removably receiving an internally threaded retaining cap 20, screwed thereon. The retaining cap 20, is provided with a central opening 21.

A flanged bearing sleeve 22, is engaged in the inner end of the journal box or housing 11, around the shaft 10 to afford a bearing therefor. The outer end of the bearing sleeve 22, projects a short distance beyond the housing shoulder 17, and affords a stop against which one of the packing members of a packing unit is adapted to abut, as shown in Figure 3.

Figure 4:
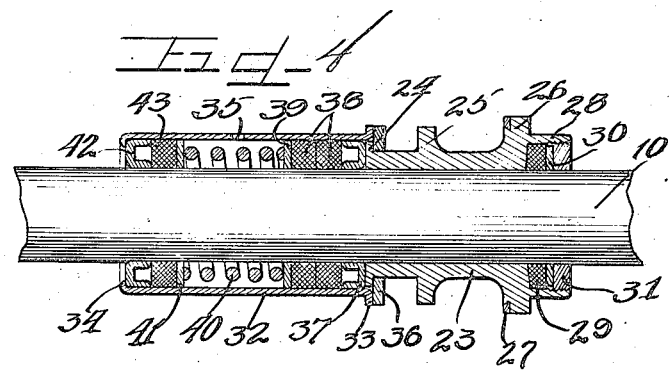
Figure 4 is a longitudinal section of the packing unit on a shaft and free of the bearing housing.

The self-adjusting oil seal pressure packing unit, is clearly shown in Figure 4, and comprises a bearing sleeve 23, having integrally formed on the inner end thereof, a flange 24. Integrally formed on the sleeve 23, intermediate the ends thereof is a intermediate flange 25, of a diameter slightly greater than the diameter of the inner end flange 24. A flange 26, is integrally formed on the outer end of the sleeve 23, and has a diameter greater than the diameter of the flange 25. A peripheral groove is formed in the inner peripheral edge of the large outer flange 26, and seated in said groove is a packing ring 27. A collar 28, is integrally formed on the outer surface of the large flange 26. Seated in the collar 28, is a packing ring 29, and a washer 30, both of which are removably secured in place by means of an externally threaded retaining ring 31, which is adjustably screwed in the internally threaded collar 28, to hold the packing ring 29, compressed.

The inner end of the bearing sleeve 23, is adapted to slidably interfit or telescope into the outer end of a packing casing or shell 32. The outer end of the shell 32, is bent outwardly at right angles to afford a flange 33, while the inner end of said shell is bent inwardly to form a retaining ring or stop flange 34. Oil inlet openings or apertures 35, which communicate with the annular oil space 35', are provided in the shell 32, surrounding the sleeve 23, in the housing 11.

To prevent separation of the bearing sleeve 23, and the shell 32, a pair of semi-circular guide plates or a split guide ring 36, is removably secured to the outer surface of the shell flange 33, around the bearing sleeve 23, by means of screw-bolts passing through apertures 36' (Figure 5) and screwed into said flange 33, said element 36 being disposed between the bearing sleeve flanges 24 and 25, which serve to limit the sliding movement between the sleeve 23 and the shell 32. Disposed within the shell 32, adjacent the sleeve flange 24, as shown, is a channel or cup packing 37, the open side of which is directed inwardly. A pair of packing rings 38 are placed to the inside of the cup packing 37, and to the outside of a washer 39. A controlling spring 40, is disposed within the shell 32, and has one end bearing against the washer 39, and the other end engaging against a second washer 41, within the inner end of said shell. A second channel or cup packing 42, is shown within the inner end of the shell 32, against the shell retaining flange 34. These cup packings may if desired be omitted. A packing ring 43, is positioned within the shell 32, between the packing ring 43 and the washer 41. Removably secured on the outer projecting end of the crank shaft section 10, is a pulley or wheel 44, to be driven by the crank shaft of the compressor.

The operation is as follows:

With the crank shaft positioned within the crank case 1, the bearing sleeves 7 and 22, are respectively positioned on the crank shaft end sections 6 and 10. The cap 9, is then secured to the crank case 1, to close one end thereof and afford a support for the shaft section 6, and its bearing sleeve 7. Registering openings in the cap sleeve 8, and the bearing sleeve 7, permit oil from the crank case to lubricate the shaft section. The packing housing 11, is next secured to the crank case 1, to close the other end thereof and afford a support for the bearing sleeve 22, which is secured in the inner end thereof. The packing unit is next slidably engaged on the crank shaft section 10, assembled as shown in Figure 4, and with the spring 40, acting to force the bearing sleeve flange 24, against the flat retaining ring 36, secured to the flange 33, of the packing shell 32. The two telescoping members of the packing unit are thus normally held in their extreme extended positions by the spring 40. The packing unit is forced into the housing 11, until the cup packing 42, engages against the bearing sleeve 22, and the shell flange 33, is positioned adjacent the housing shoulder 18. By applying the cap 20 to the outer threaded end of the housing 11, the bearing member or sleeve 23 may be forced to telescope or slide into the shell 32, compressing the spring 40, and the respective packing members disposed within the shell. The bearing sleeve 23, moves inwardly until the flange 25, thereof strikes the plate 36, secured on the outer end of the shell 32. In this position of the bearing sleeve 23, the packing 27, of the flange 26, seats against the housing shoulder 19, as clearly shown in Figure 3. The retaining cap 20, is engaged around the collar 28, and is threaded on the threaded outer end of the housing 11, to hold the packing unit secured in place.

The crank shaft of the compressor is driven from the end 10, by means of the driving pulley 44, which may be connected by a belt to any suitable power machine. Oil from the crank case is splashed into the oil cup 15, and flows down through the passage 16, and through the shell opening 35, into the spring chamber to lubricate the shaft section 10. The adjacently disposed packing members within the shell 32, are compressed both by the spring 40, and the bearing sleeve 23, while the packing in the collar 28, is held compressed by the adjustable retaining ring 31, threaded into said collar. Oil cups are provided for lubricating sleeve 23. The packing arrangement described and illustrated affords an oil seal and is self-adjusting since any wear of the packing members is automatically compensated for by the action of the compressed spring 40, which acts to force the packing members, on the opposite ends thereof, together until the packing members are completely worn out and ready for replacement. Of course, the packing may be used for either a rotative or a reciprocating element.

To replace any of the packing members, the packing unit may be removed as a whole from the housing 11, after which the retaining plate 36, is taken off to permit separation of the telescoping members 23 and 32. The spring 40, or any of the packing members or washers may then be conveninetly replaced.

We are aware that the details of construction may be varied through a wide range without departing from the principles of this invention, and we therefore do not purpose limiting the patent granted otherwise than necessitated by the prior art.

We claim as our invention:—

1. A shaft packing unit, comprising a shell, a bearing member adapted to telescope freely therein, packing members in said shell, a spring between said packing members acting adjustably to compress the same and force said shell and bearing member in opposite directions longitudinally of the shell, and means in said unit for retaining all of said parts associated with each other.

2. A shaft packing unit, comprising a shell, a bearing member freely telescoping therein, means in said unit for retaining said shell and bearing member associated with each other, a plurality of sets of packing members retained against displacement in said shell, and a resilient member in said shell between said sets of packing members acting to compress the same and to hold said shell and bearing member in extended position.

3. A shaft packing unit, comprising a shell, a bearing member disposed freely to telescope thereinto and retained against displacement therefrom, adjustable packing means in the outer end of said bearing member, packing members in each end of said shell and retained therein, and a spring in said shell separating said sets of packing members and adapted to compress and automatically adjust the same, said bearing member adapted to compress said packing members and spring.

4. A shaft packing unit, comprising a shell, a bearing member slidably engaged in one end thereof, flanges on said member, means removably secured to said shell and engaged between said flanges to limit the relative movement of said member with respect to said shell, packing members in said shell, and resilient means in said shell between said packing members adapted to compress said packing members and force said slidable member outwardly.

5. A shaft packing unit, comprising an interfitting shell and bearing member, means for limiting the relative movement of said shell and member, a cup packing in each end of said shell, packing means disposed at the inside of each of said cup packings, a washer positioned at the inside of each packing means, and a spring set between said washers and adapted to compress said packing means and said cup packings to form a self-adjusting packing unit.

6. The combination with a shaft housing, of a shell therein, packing members in each end of said shell, a spring between the packing members for automatically adjusting the same, bearing means telescopically engaged with said shell, means for retaining said shell, packing members and bearing members against relative separation, and means for forcing said bearing means into said shell further to compress said packing members and said spring.

In testimony whereof we have hereunto subscribed our names in the presence of two subscribing witnesses.

WILLIAM WISHART.
ALBERT H. MORRELL.

Witnesses:
LE ROY D. KILEY,
EARL M. HARDINE.